Figure 1:
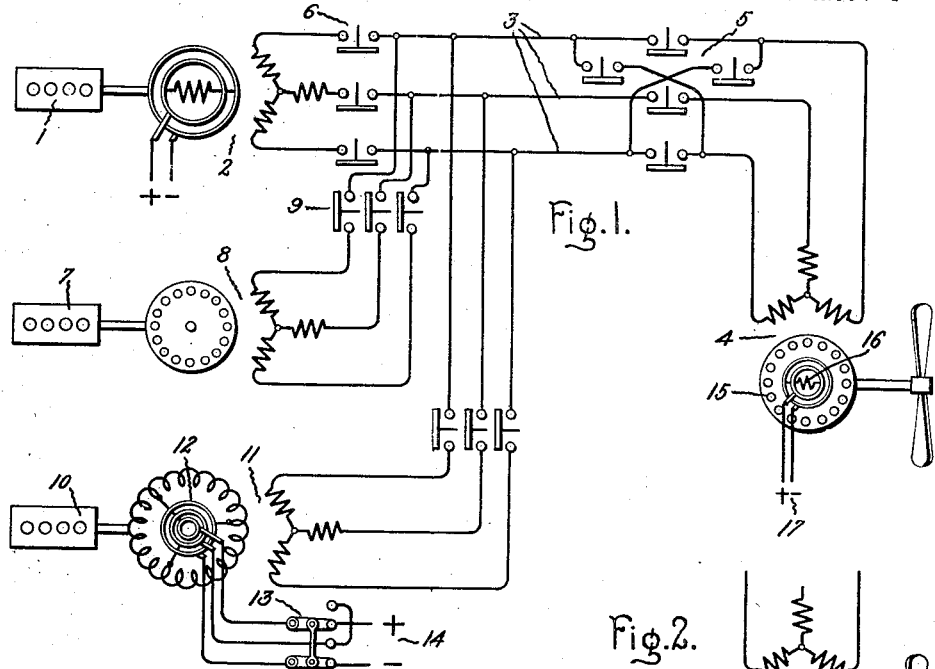

Jan. 6, 1925.

J. MARTIN 1,522,199

ELECTRIC SHIP PROPULSION

Filed July 26, 1921    3 Sheets-Sheet 1

Inventor:
John Martin,
by *Albert G. Davis*
His Attorney.

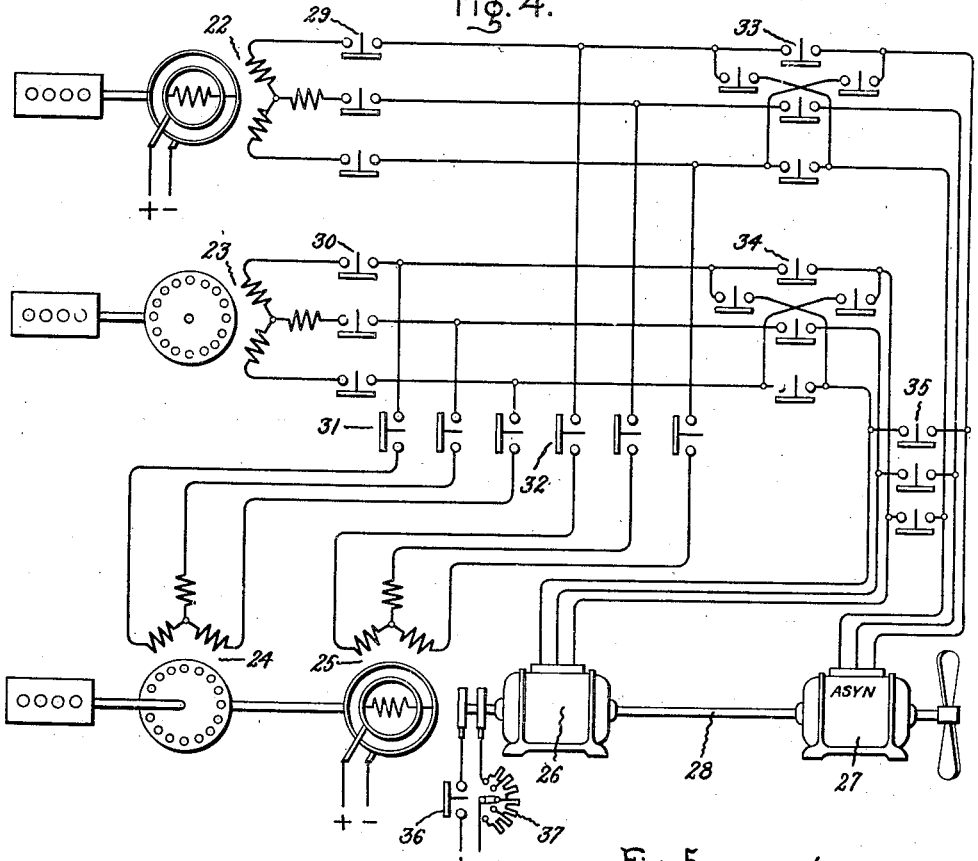
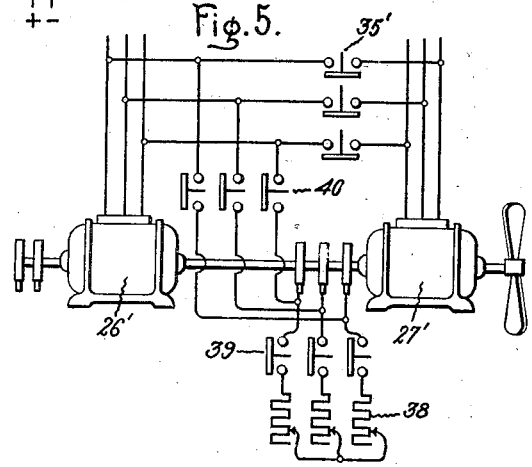

Jan. 6, 1925.

J. MARTIN 1,522,199

ELECTRIC SHIP PROPULSION

Filed July 26, 1921

3 Sheets-Sheet 3

Inventor:
John Martin,
by Albert G. Davis
His Attorney.

Patented Jan. 6, 1925.

1,522,199

UNITED STATES PATENT OFFICE.

JOHN MARTIN, OF RUGBY, ENGLAND, ASSIGNOR TO GENERAL ELECTRIC COMPANY, A CORPORATION OF NEW YORK.

ELECTRIC SHIP PROPULSION.

Application filed July 26, 1921. Serial No. 487,600.

*To all whom it may concern:*

Be it known that I, JOHN MARTIN, a subject of the King of Great Britain, residing at Rugby, in the county of Warwickshire, England, have invented certain new and useful Improvements in Electric Ship Propulsion, of which the following is a specification.

This invention relates to systems of electric ship propulsion in which a propeller shaft is driven by one or more electric motors supplied with current from generators connected to prime movers. In such systems it frequently happens that under certain circumstances more power is needed to drive the propeller than it is convenient to supply from one prime mover and generating unit. This is especially the case where internal combustion engines are used as prime movers to drive the generators and with such prime movers it is usually considered advisable to have at least one spare engine and generating unit so that overhauling and repairs may be carried out on any one set at any time.

This invention relates more particularly to systems employing this type of prime mover and to that end it consists in providing a suitable arrangement of prime movers, generators and motors. In ordinary practice, where alternating current is used, alternating current generators of the synchronous type are usually provided, these being run in parallel. This involves the synchronizing of the generators before switching them on to the power circuit which is a delicate operation and requires some time to carry out. Further, if a generator should happen to be connected to the circuit badly out of phase, considerable damage might be done to the generating units. The synchronizing of generators for parallel working should therefore be avoided in cases of electric ship propulsion, because of the difficulty in carrying out the operation quickly and the delicacy of the operation and also on account of the damage which might result from connecting generators to the circuit which are badly out of phase.

According to the present invention, I propose to avoid the necessity of synchronizing by using a combination of synchronous and asynchronous generators, and where necessary both types of motors also. I might also use machines which can be operated either as synchronous or as asynchronous motors. Such machines are best constructed of the non-salient pole rotor type, the rotor being provided with a distributed polyphase winding, the terminals of which are connected to slip rings which may be short circuited either on themselves or through resistances or may be used for direct current excitation.

My invention will be better understood from the following description taken in connection with the accompanying drawings and its scope will be pointed out in the appended claims.

Figure 2:
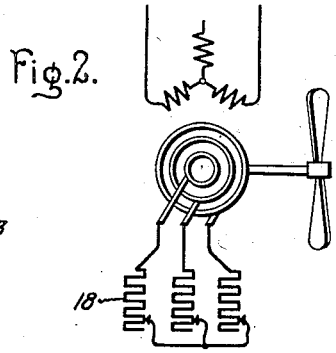
Figure 3:
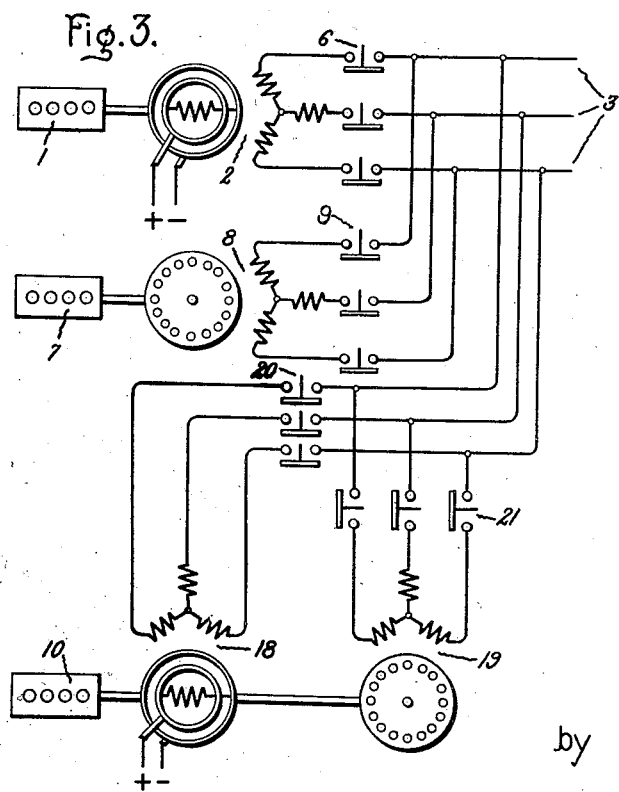
Figure 6:
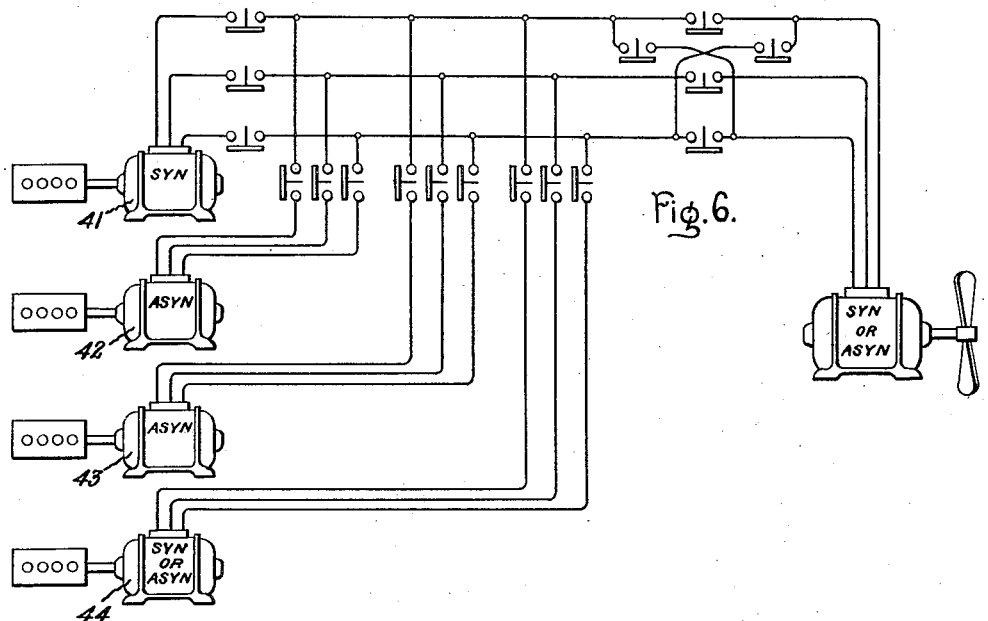
Figure 7:
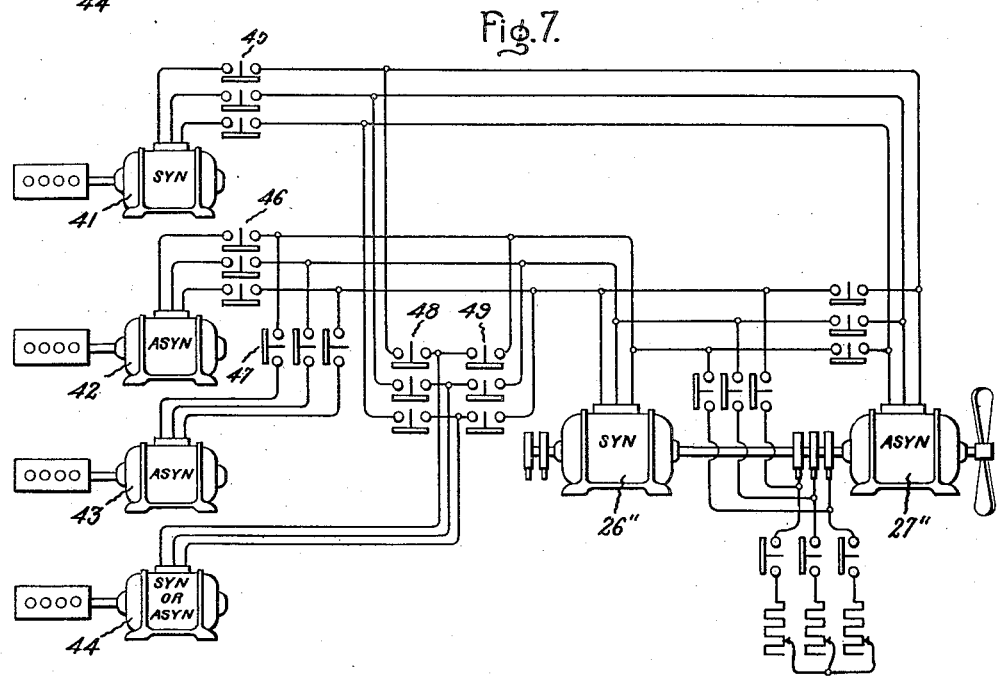

In the accompanying drawings, Fig. 1 is a diagrammatic illustration of ship propulsion system utilizing three prime movers; Fig. 2 shows a modified type of motor which may be used in the system of Fig. 1; Fig. 3 illustrates a modification of the system of Fig. 1; Fig. 4 illustrates a further modification wherein two motors are used on the propeller shaft; Fig. 5 illustrates a modification of the two motor drives which may be used; Fig. 6 illustrates a system in which four prime movers are used, and Fig. 7 illustrates a further modification using four prime movers.

In carrying my invention into effect according to one modification, if the power required to drive the propeller is such that normally it would require two prime movers of the most convenient size to supply the power, then three prime mover generating sets would be installed, one set being kept idle so that it can be switched in when it is desired to overhaul or repair one of the other sets. This modification is shown in Fig. 1 wherein the first set comprises a prime mover 1 coupled to the synchronous generator 2 arranged to supply the mains 3 which are connected to the propeller driving means 4 through suitable circuit controlling and reversing switches 5. Suitable circuit controlling means 6 are provided to enable the generator 2 to be connected with or disconnected from the mains 3. The second set comprises the prime mover 7 coupled to the asynchronous generator 8 which is arranged to be connected with the mains 3 by the circuit controlling means 9. The third set comprises a prime mover 10 arranged to drive a generating means 11 capable of acting either as a synchronous or as an asynchronous generator to take the place of either the first or second set. As shown in Fig. 1 the generating means 11 takes the form of a single machine preferably of the non-salient pole type fitted with rotor slip rings 12. Suitable switching means 13 are provided for connecting the rotor slip rings to a suitable source of excitation 14 for synchronous operation or for short circuiting the slip rings for asynchronous operation. The propeller driving means can be of the synchronous or asynchronous type and if the former is used it may be fitted with a squirrel cage or other form of winding to enable it to start or to reverse as an induction motor. If an asynchronous type of machine is used it can be either of the squirrel cage or slip ring type. In Fig. 1 the propeller driving means is represented as provided with an induction motor element represented as a squirrel cage winding 15 and a synchronous motor element comprising an exciting winding 16 adapted to be connected to any suitable source of direct current represented by the leads 17. Fig. 2 shows a slip ring type of asynchronous motor with a starting and regulating resistance 18 which may be used if desired.

To start the propeller driving motor in the system shown in Fig. 1, both the power and magnetizing current should be supplied from a synchronous generator and the first generator thrown on the circuit supplying current to the motor terminals should be of this type. For example, the first prime mover set may be used, the switches 6 being closed and the switches 5 being operated for the desired direction of motion in a manner well known in the art. The power from one generator will be sufficient to start the driving motor and bring it up to half speed. The second generator connected to the power circuit must be of the asynchronous type in order to avoid synchronizing. The prime mover driving this generator can be run up approximately to the same frequency as that already supplying current to the driving motor and then connected to the supply circuit 3 when it will receive its magnetizing current from the first generator connected or from both this generator and the driving motor if the driving motor is arranged for synchronous operation by the energization of its exciting winding. The propeller driving motor can now be brought up to speed by increasing the prime mover speed or by taking the resistance out of the motor circuit if the motor is of the slip ring type or by both of these means. Since the third prime mover is coupled to a generating means capable of acting either as a synchronous or as an asynchronous generator it may be connected to the mains 3 to take the place of either the first or the second set.

Instead of constructing the generating means of the third or standby set as a single machine capable of either synchronous or asynchronous operation, the generating means may consist of a synchronous generator and an asynchronous generator either of which may be used as required. This modification is shown in Fig. 3 wherein the prime mover 10 is arranged to drive both the synchronous generator 18 and the asynchronous generator 19. In this case the synchronous generator will preferably be of the usual salient pole type and the asynchronous generator of the squirrel cage type. It will be apparent that by closing the switches 6, the generator 2 may be connected to the mains 3 and that by closing the switches 20 the generator 18 may be connected to these mains instead of the generator 2. Similarly by proper operation of the switches 9 and 21 either of the asynchronous generators 8 or 19 may be connected to the mains 3. The operation of the system shown in Fig. 3 will be obvious from the description set forth heretofore in connection with the operation of the system shown in Fig. 1.

According to another modification I may construct the propeller driving means so as to comprise two motors for driving the propeller, one of which will be of the asynchronous type and the other of the synchronous type. The two motors will preferably be of equal power and each one will be equal to the power of a prime mover unit. This modification is shown in Fig. 4 in which the synchronous generator of the first set is shown at 22 and the asynchronous generator of the second set at 23. The standby set comprises an asynchronous generator 24 and the synchronous generator 25. The synchronous propeller driving motor is shown at 26 and the asynchronous motor at 27, both motors being mounted on the propeller driving shaft 28. Circuit controlling means 29, 30, 31 and 32 are provided for connecting the respective generators in circuit. By proper manipulation of the circuit controlling means 29 and 32, either synchronous generator may be connected to supply current to the asynchronous motor 27 and by proper manipulation of the circuit controlling means 30 and 31, either asynchronous generator 23 or 24 may be connected in circuit to supply the synchronous motor 26. Suitable circuit controlling and reversing switches 33 and 34 are provided for controlling the direction and operation of the driving motors. Suitable circuit controlling means 35 are preferably provided for inter-connecting the synchronous and asynchronous motors 26 and 27 for quickly stopping the propeller as will be hereinafter described in connection with the description of the operation of the system. Suitable means are provided for controlling the excitation circuit of the synchronous machines in all of the modifications. Such means are common in the art and are diagrammatically indicated in connection with the excitation circuit of the motor 26 as comprising a switch 36 and rheostat 37.

To start a system of the type shown in Fig. 4 from rest to full speed, the two prime mover sets may be run up to half speed. The asynchronous propeller motor 27 may then be connected to one of the generators which must be of the synchronous type. If the motor is of the squirrel cage type it will run up to half speed and if of the slip ring type it will reach this speed when the rotor is short circuited. The synchronous motor 26 on the propeller shaft can now be excited for approximately full flux and the second generator which must be of the asynchronous type, connected in the circuit. The excitation of the synchronous motor may take place after the connecting of the asynchronous generator to the power circuit if desired. Both prime movers can now be brought up to speed together, thus bringing both of the motors of the propeller up to speed.

The use of two motors is of great advantage where a quick stoppage of the propeller is required. To stop the propeller in the system shown in Fig. 4, all of the field excitation should be taken off of the machines and the generators disconnected from the motors. The circuit controlling means 35 may then be closed to connect the primary of the asynchronous motor to the stator of the synchronous motor with the proper direction of phase rotation so that when the synchronous motor is again excited it will be driven by the propeller as a generator to drive the asynchronous motor in the opposite directions. Both machines will thus act as a brake on the propeller and bring it to rest. It is, of course, obvious to those skilled in the art that where an asynchronous motor of the slip ring type is used, the arrangement may be such that the braking effect is produced by connecting the stator of the synchronous motor to the secondary of the asynchronous motor.

In order to reverse the direction of rotation of the propeller the operation of stopping as above described is first carried out and the motors are then started up again in the reverse direction as described above for starting in the forward direction.

Fig. 5 illustrates a modification of the propeller driving means shown in Fig. 4 adapted for cascade operation. The asynchronous motor 27' is represented as a slip ring motor provided with any well known form of starting resistance 38. Circuit controlling means 39 are provided for interrupting the connection between the slip rings and the resistance 38. By closing the circuit controlling means 40 the secondary of the asynchronous motor 27' may be connected to the stator of the synchronous motor 26'. Circuit controlling means 35' may be provided for the same purpose that the circuit controlling means 35 are provided in Fig. 4. The rotor of the asynchronous motor will be wound for the same voltage as the stator of the synchronous motor. As thus arranged the propeller may be started from rest to half speed. One prime mover and generator of the synchronous type will be run up to full speed and connected to the asynchronous propeller motor by control of the starting resistance 38. This motor can be run up approximately to half speed and then the synchronous motor excited to normal excitation and connected in cascade with the rotor of the asynchronous motor by closing the switches 40. The resistance across the slip rings may then be open circuited by opening the switches 39 when the motors will continue running at half speed the efficiency will be high and the synchronous motor field can be excited so as to give high power factor and reduce the losses in the electrical system to a minimum.

A scheme such as heretofore described can be used when the necessary amount of power from the prime movers is divided up into three units with an additional or spare unit. Such a system is indicated in Fig. 6 where the propeller driving means is represented as a single motor which may be of the synchronous or asynchronous type. In this figure, 41 represents a generator of the synchronous type or capable of acting as such; 42 and 43 represent generators of the asynchronous type or capable of acting as such. One generating means 44 must be capable of acting either asynchronous or synchronous. Alternatively one of the prime movers may drive two generators, one of the synchronous and one of the asynchronous type. When one synchronous generator is connected to the propeller motor the other two providing the balance of power will be of the asynchronous type and the standby set will be capable of acting as either type. The starting up from rest and reversing will be carried out in a similar way to that described above where the prime movers are divided up into two units with one spare.

The system using two motors on the propeller shaft offers facilities for efficiently running at half speed with full speed of the prime mover if one of the motors is of the slip ring asynchronous type and one preferably of the synchronous type. Fig. 7 illustrates an arrangement of this kind where four prime movers are used as in the system of Fig. 6. In this figure the motors 26″ and 27″ are arranged and connected as shown in Fig. 5. By closing switches 45, 46, and 47, the synchronous machine 41 and the two asynchronous machines 42 and 43 may supply current for driving the propeller in the same manner that the propeller is driven in the arrangement shown in Fig. 4. By proper manipulation of the switches 48 and 49 the generating means of the standby set may be connected to take the place of either the synchronous machine 41 or one of the asynchronous machines 43. For this combination probably the best arrangement is to make the asynchronous motor half the power of the synchronous motor. Under full speed conditions the asynchronous motor will be driven by one generating unit of the synchronous type and the synchronous motor by two generating units of the asynchronous type, the standby set being capable of acting either as a synchronous or asynchronous generator as described previously. As an example, for a ship requiring 3000 S. H. P. this could be equipped with a 1000 H. P. slip ring induction motor and a 2000 H. P. synchronous motor both mounted on the propeller shaft while the engine generator sets would be four in number—one a standby—each of 1000 H. P.

Similar systems can be used for a larger number of prime mover units and it will be understood that the number of units, etc., can be duplicated for a two-propeller ship—triplicated for a three-propeller ship and so on.

What I claim as new and desire to secure by Letters Patent of the United States, is,—

1. A system of electric ship propulsion comprising a propeller, propeller driving means comprising an alternating current motor, a synchronous generator and an asynchronous generator adapted to supply current for said propeller driving means, separate prime movers for driving said generators, generating means capable of either synchronous or asynchronous operation arranged to be connected to take the place of either of said generators to supply current to said propeller driving means and a separate prime mover for driving said generating means.

2. A system of electric ship propulsion comprising a propeller, propeller driving means comprising an alternating current motor, a synchronous generator and an asynchronous generator adapted to supply current to said propeller driving means, separate prime movers for said generators, a separate prime mover driving a synchronous generator and an asynchronous generator arranged to be connected to take the place respectively of said first mentioned generators in supplying current to the propeller driving means.

3. An electric ship propulsion system comprising a propeller shaft, a synchronous motor and an asynchronous motor mounted on said shaft, a synchronous generator arranged to be connected to supply current to said asynchronous motor and an asynchronous generator arranged to be connected to supply current to said synchronous motor, a separate prime mover for each of said generators, and a separate prime mover driving a synchronous generator and an asynchronous generator arranged to be connected to take the place respectively of said first mentioned generators in supplying current to the propeller driving motors.

4. An electric ship propulsion system comprising a propeller shaft, a synchronous motor and an asynchronous motor mounted on said shaft, a synchronous generator arranged to be connected to supply current to said asynchronous motor and an asynchronous generator arranged to be connected to supply current to said synchronous motor and switching means for electrically interconnecting the two motors so that the synchronous motor when driven by the propeller will operate as a synchronous generator tending to drive the asynchronous motor in a direction to stop the propeller.

5. An electric ship propulsion system comprising a propeller shaft, a synchronous motor and an asynchronous motor mounted on said shaft, a synchronous generator arranged to be connected to supply current to said asynchronous motor and an asynchronous generator arranged to be connected to supply current to said synchronous motor, switching means arranged to connect said motors in cascade for slow speed operation and a means whereby the two motors may be electrically interconnected so that the synchronous motor when driven by the propeller will operate as a synchronous generator tending to drive the asynchronous motor in a direction to stop the propeller.

In witness whereof, I have hereunto set my hand this second day of July, 1921.

JOHN MARTIN.

Witnesses:
J. A. FOSTER,
D. WHITE.